H. W. SANNER.
CONVEYER.
APPLICATION FILED JUNE 14, 1910.
1,015,086.
Patented Jan. 16, 1912.
2 SHEETS—SHEET 1.
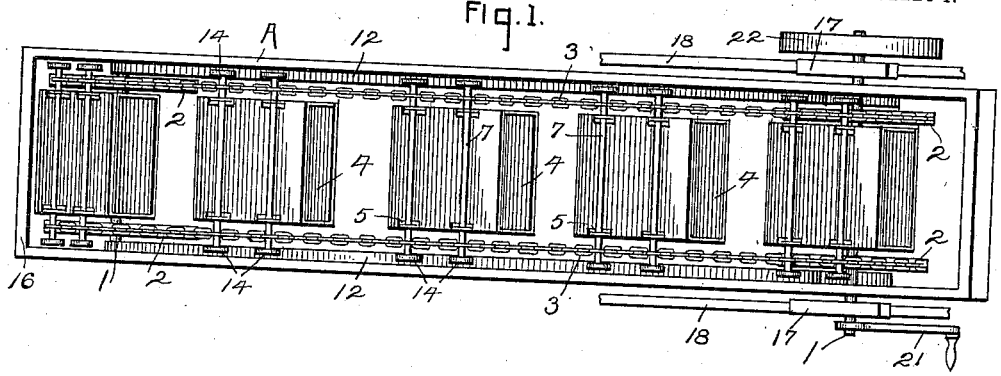
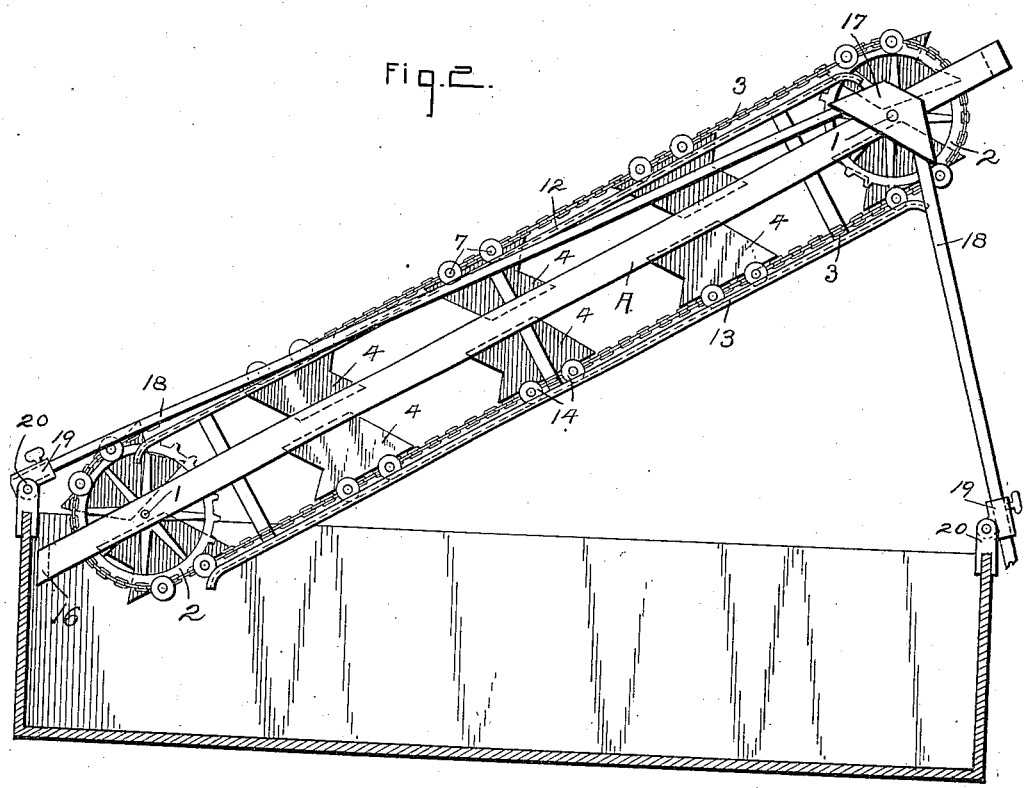

H. W. SANNER.
CONVEYER.
APPLICATION FILED JUNE 14, 1910.
1,015,086.
Patented Jan. 16, 1912.
2 SHEETS—SHEET 2.
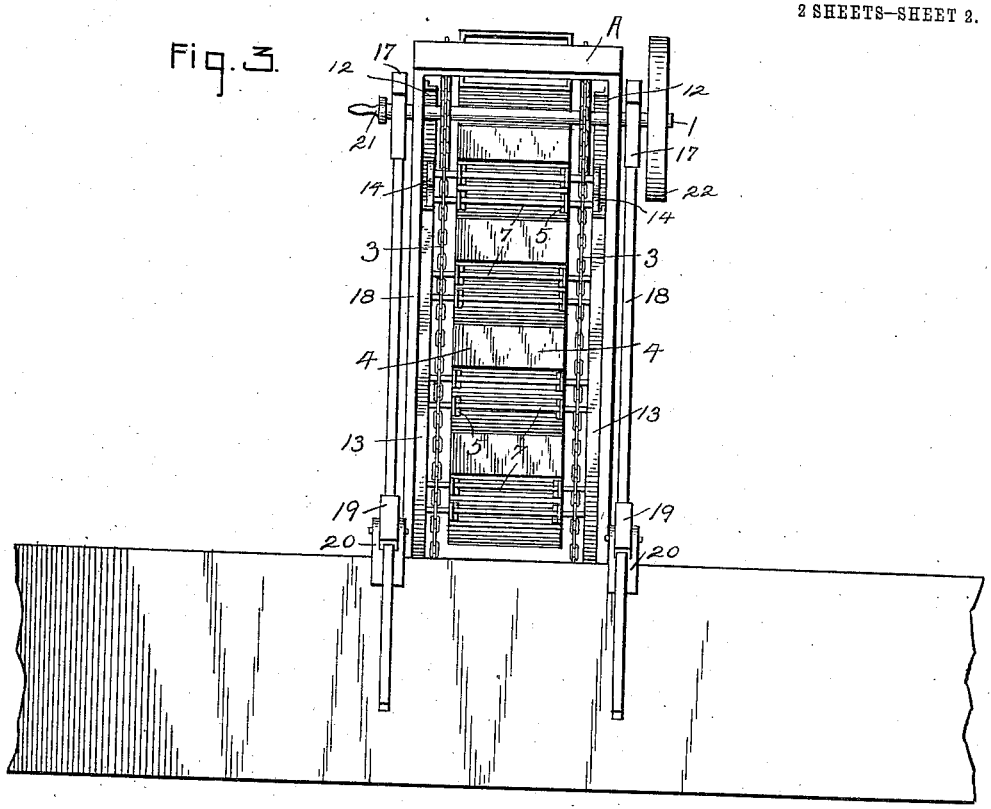
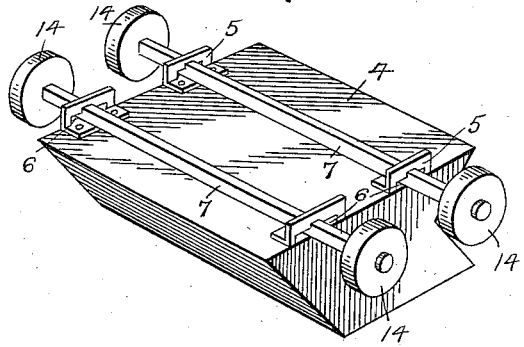
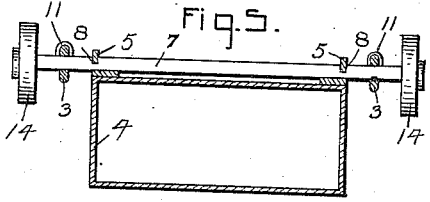
Witnesses
W. Ray Taylor
Lloyd W. Patch
Inventor
Harry W. Sanner
By C. A. Brandenburg
His Attorney

UNITED STATES PATENT OFFICE.

HARRY WESLEY SANNER, OF BALTIMORE, MARYLAND.

CONVEYER.

1,015,086.  Specification of Letters Patent.  Patented Jan. 16, 1912.

Application filed June 14, 1910. Serial No. 566,729.

*To all whom it may concern:*

Be it known that I, HARRY W. SANNER, a citizen of the United States, residing at Baltimore, in the State of Maryland, have invented certain new and useful Improvements in Conveyers, of which the following is a specification.

My invention relates to an improvement in conveyers, and the object is to provide a bucket conveyer which can be driven by any suitable means, and which can be adjusted to any angle for removing the coal from a car or bin.

A further object is in providing means for causing the bucket to be filled as it travels around the conveyer frame, and another object is in providing means whereby the buckets will be so connected to the chains that the chains will be prevented from binding as they pass around the sprocket wheels at the ends of the frame.

The invention consists in certain novel features of construction and combinations of parts which will be hereinafter fully described and pointed out in the claims.

In the accompanying drawing:—Figure 1 is a top plan view; Fig. 2 is a view in side elevation of the conveyer; Fig. 3 is an end view showing the support which adjustably supports the conveyer upon a car or bin; Fig. 4 is a perspective view showing the manner of mounting the axles upon the bucket; Fig. 5 is a sectional view through the axle and bucket; and Fig. 6 is a detail view showing the manner of connecting the chains to the axles.

A represents the conveyer frame, and mounted upon the shafts 1, 1, at each end of the frame, are sprocket wheels 2, 2. Mounted upon the sprocket wheels are endless chains 3, which are provided with buckets 4. A crank 21 is provided for rotating the upper shaft 1, whereby the belt is caused to be moved. A pulley wheel 22 is also mounted on the shaft, whereby motion can be transmitted to the shaft through the pulley wheel, the pulley wheel receiving its power from any suitable source, not shown.

Brackets 5 are mounted on the bottoms of the buckets, and are provided with slots 6. The brackets at the rear end of the buckets are provided with elongated slots. Mounted in the brackets are axles 7, which are provided with recesses 8. The axles 7 are made so that they are capable of being slid into the slots 6 in the brackets, and then given a quarter turn so that the recesses or notches 8 receive the bracket therein and prevent any lateral movement of the axles. The elongated slots in the rearmost brackets permit the rear axles to have a reciprocatory movement which allows the chains to become sufficiently slack and prevents binding when the buckets are passing around the sprocket wheels. The sprocket chains 3 are provided at certain intervals with links 9, which are provided with notches 10 in which the axles 7 are received, and U-shaped pins 11 pass through the axles and around the links 10 for locking them upon the axle and preventing any lateral movement of the chains. Tracks 12 and 13 are supported by the frame, so that the rollers 14 on the axles 7 will have a bearing surface as the buckets are being conveyed into the car or bin for the load, and as they pass upward and over the top of the conveyer, on the track 12 with the load; the tracks 12 and 13 prevent any sagging of the chains, and insure the buckets traveling in the same path. The buckets are all carried within the frame, and are so mounted upon the chains that they are always carried between the chains, and never on the exterior or outer side of the chains. In this way, the buckets can always be carried directly to the bottom and filled at the lower end. The buckets are closed on both sides and one end, the forward end only being open, so that when the bucket is moved to the lower end of the conveyer frames, it will be filled. The fender 16 which is supported at the lower end of the frame A, will cause the bucket to be filled, as it prevents the bucket from forcing the coal away, and tends to push the coal into the bucket as the bucket travels around the lower sprocket wheels.

Connected to the upper end of the frame are heads 17, to which are connected props 18, the props 18 being provided with clamps 19, which clamps are provided with hooks 20, which are adapted to be received over the top of the car or bin. The clamps 19 have the hooks 20 pivotally connected thereto, and the pivotal connection between the hooks and clamps allows the clamps to be moved to different angles, to accomplish the desired adjustments with the props in raising or lowering the conveyer.

In supporting the buckets on the inner side of the chains, there can be no obstruction to prevent the buckets from traveling around the conveyer and at the same time being loaded. Furthermore, the conveyer can be adjusted at different angles to suit the requirements in removing the coal from the bin, by adjusting the props.

Having fully described my invention, what I claim as new and desire to secure by Letters Patent, is:—

1. In a conveyer, the combination with a frame having sprocket wheels journaled thereon, of endless chains mounted on the wheels, means for transmitting motion to the chains, axles connected to the chains, buckets, slotted brackets connected to the buckets, said axles having recesses therein, adapted to receive the brackets for locking the buckets upon the axles.

2. In a conveyer, the combination with a frame having sprocket wheels, of endless chains mounted on the sprocket wheels, means for transmitting motion to the chains, axles connected to the chains having recesses therein, buckets mounted on the axles, and slotted brackets connected to the buckets through which the axles pass, said brackets adapted to be received in the recesses in the axles for locking the buckets upon the axles and preventing lateral movement of the buckets on the axles.

3. In a conveyer, the combination with a frame having sprocket wheels mounted thereon, of endless chains mounted on the wheels, axles connected to the chains, buckets, brackets on the buckets having slots through which the axles extend, said axles having recesses therein which receive the edges of the brackets upon a partial rotation of the axles, whereby the axles and brackets are connected together.

In testimony whereof I affix my signature, in the presence of two witnesses.

HARRY WESLEY SANNER.

Witnesses:
CHARLES LEE MERRIKEN,
FRANK M. MERRIKEN.

---

Copies of this patent may be obtained for five cents each, by addressing the "Commissioner of Patents, Washington, D. C."